(12) United States Patent
Malledant et al.

(10) Patent No.: US 8,155,137 B2
(45) Date of Patent: Apr. 10, 2012

(54) METHOD AND SYSTEM FOR TRANSMITTING A MULTICAST STREAM OVER A DATA EXCHANGE NETWORK

(75) Inventors: Matthieu Malledant, Issy les Moulineaux (FR); Stéphane Rouchy, Issy les Moulineaux (FR); Claire Gilbertas, Issy les Moulineaux (FR)

(73) Assignee: France Telecom, Paris (FR)

( * ) Notice: Subject to any disclaimer, the term of this patent is extended or adjusted under 35 U.S.C. 154(b) by 768 days.

(21) Appl. No.: 11/918,667

(22) PCT Filed: Apr. 12, 2006

(86) PCT No.: PCT/FR2006/000804
§ 371 (c)(1),
(2), (4) Date: Nov. 30, 2007

(87) PCT Pub. No.: WO2006/111635
PCT Pub. Date: Oct. 26, 2006

(65) Prior Publication Data
US 2009/0103534 A1    Apr. 23, 2009

(30) Foreign Application Priority Data

Apr. 18, 2005   (FR) ...................................... 05 03853

(51) Int. Cl.
*H04J 3/26* (2006.01)
(52) U.S. Cl. ........................................ 370/432; 370/486
(58) Field of Classification Search .................. 370/486; 725/86
See application file for complete search history.

(56) References Cited

U.S. PATENT DOCUMENTS 7,072,337 B1 * 7/2006 Arutyunov et al. ........... 370/389
7,549,160 B1 * 6/2009 Podar et al. ....................... 726/4

2003/0206549 A1   11/2003  Mody et al.
2004/0045036 A1 *  3/2004  Terasaki ........................ 725/116
2004/0109459 A1 *  6/2004  Madour et al. ................ 370/401

(Continued)

FOREIGN PATENT DOCUMENTS

EP         1 318 628 A1    6/2003

(Continued)

OTHER PUBLICATIONS

W. Fenner, "RFC 2236: Internet Group Management Protocol, Version 2", 1997, Network Working Group.*

(Continued)

*Primary Examiner* — Huy Vu
*Assistant Examiner* — Omer Mian
(74) *Attorney, Agent, or Firm* — McKenna Long & Aldridge LLP

(57) ABSTRACT

The invention concerns a method for transmitting a multicast stream in a data exchange network, at an access point (AP). It consists in analyzing (A) the multicast stream by data frames to detect the multicast address at the link ($MUA_x$, x=2) of the multicast stream $\{MUF\{T[MUA]\}\}$, substituting (B) in each frame at the multicast address ($MUA_x$) at the link a unicast address ($UNA_y$) of a potential receiver terminal ($T_y$) of the multicast stream to generate a substituted multicast frame ($T[UNA_y]$), transmitting (C) instead of the multicast stream at least one unicast stream, a succession of substituted multicast frames to the terminal at the unicast address at the link. This allows taking advantage of the acknowledgement mechanisms of frames of the transmission of unicast stream for substituted multicast frames. The invention is applicable to transmission of multicast stream in WiFi or CPL network.

13 Claims, 6 Drawing Sheets

U.S. PATENT DOCUMENTS

| | | | |
|---|---|---|---|
| 2005/0002365 A1 | 1/2005 | Xu | |
| 2005/0076099 A1* | 4/2005 | Wang et al. | 709/219 |
| 2005/0076145 A1* | 4/2005 | Ben-Zvi et al. | 709/245 |
| 2005/0091313 A1* | 4/2005 | Zhou et al. | 709/204 |
| 2006/0018335 A1* | 1/2006 | Koch et al. | 370/432 |
| 2007/0265012 A1* | 11/2007 | Sorbara et al. | 455/446 |

FOREIGN PATENT DOCUMENTS

| | | | |
|---|---|---|---|
| WO | WO 03/065677 | * | 8/2003 |
| WO | WO 2004/114623 A3 | | 12/2004 |

OTHER PUBLICATIONS

Hauge, M. et al. "Multicast in 3G Networks: Employment of Existing IP Multicast Protocol in UMTS," Proceedings of WOWMOM 2002; The $5^{th}$ ACM International Workshop on Wireless Mobile Multimedia; Atlanta, GA, Sep. 28, 2002; Proceedings of the ACM International Workshop on Wireless Mobile Multimedia, New York, NY; ACM, US, Sep. 28, 2002, pp. 96-103, XP001047038 ISBN: 1-58113-474-6.

"Digital Cellular Telecommunications System (Phase 2+); Universal Mobile Telecommunications Systems (UMTS); Internetworking Between the Public Land Mobile Network (PLMN) Supporting Packet Data Networks (PDN) (3GPP TS 29.061 V6.4.0 (Mar. 2005); ETSI TS 129 061" ETSI Stabdards, European Telecommunications Standards Institute, Sophia-Antipo, FR, pp. 1-91, XP014027820 ISSN: 0000-0001.

* cited by examiner

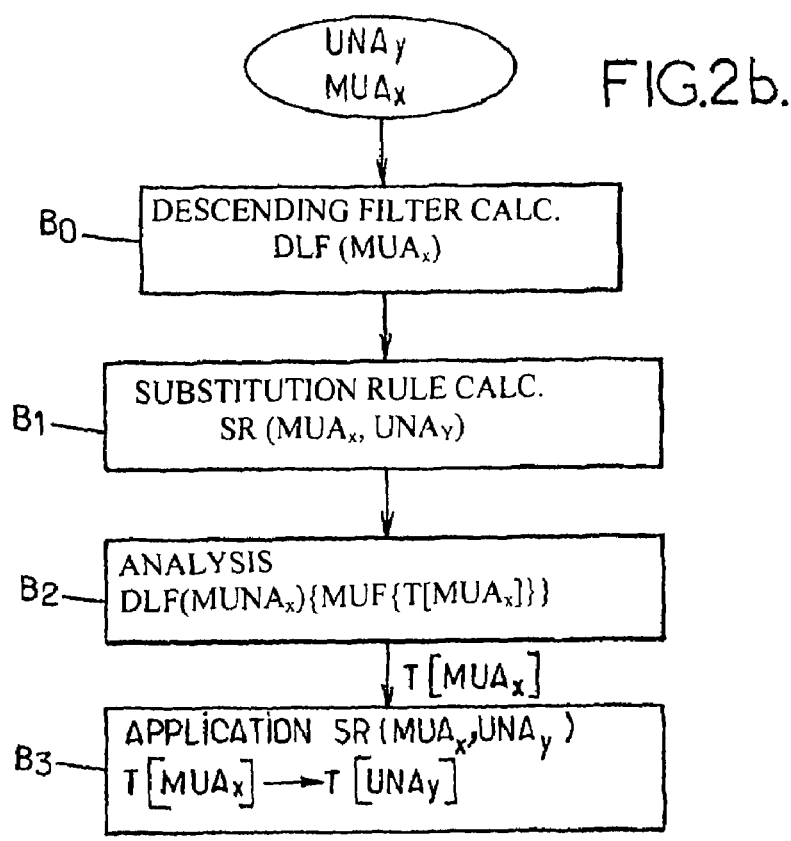
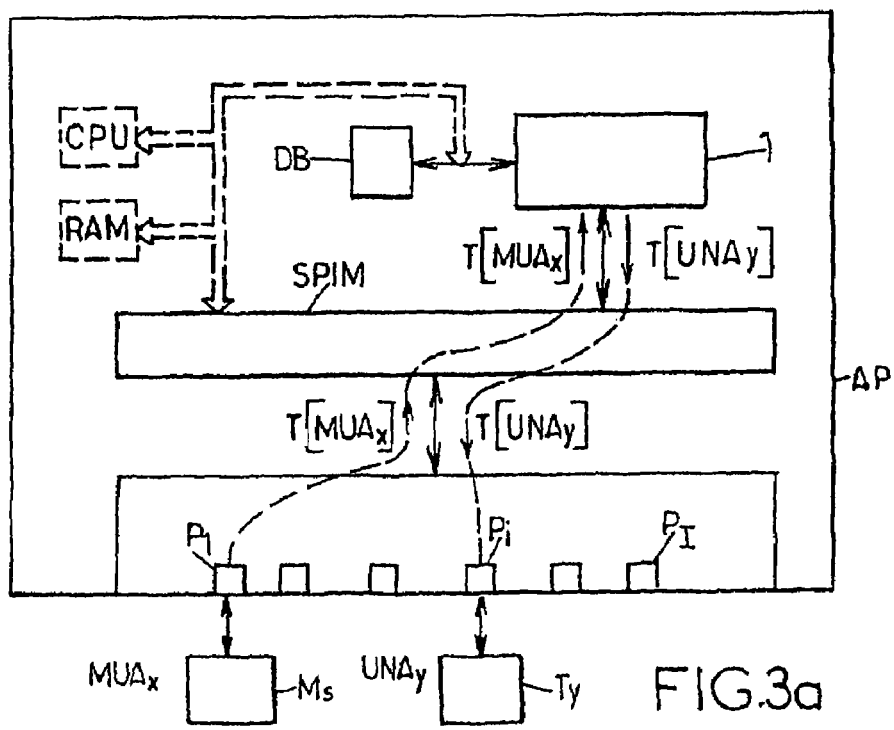

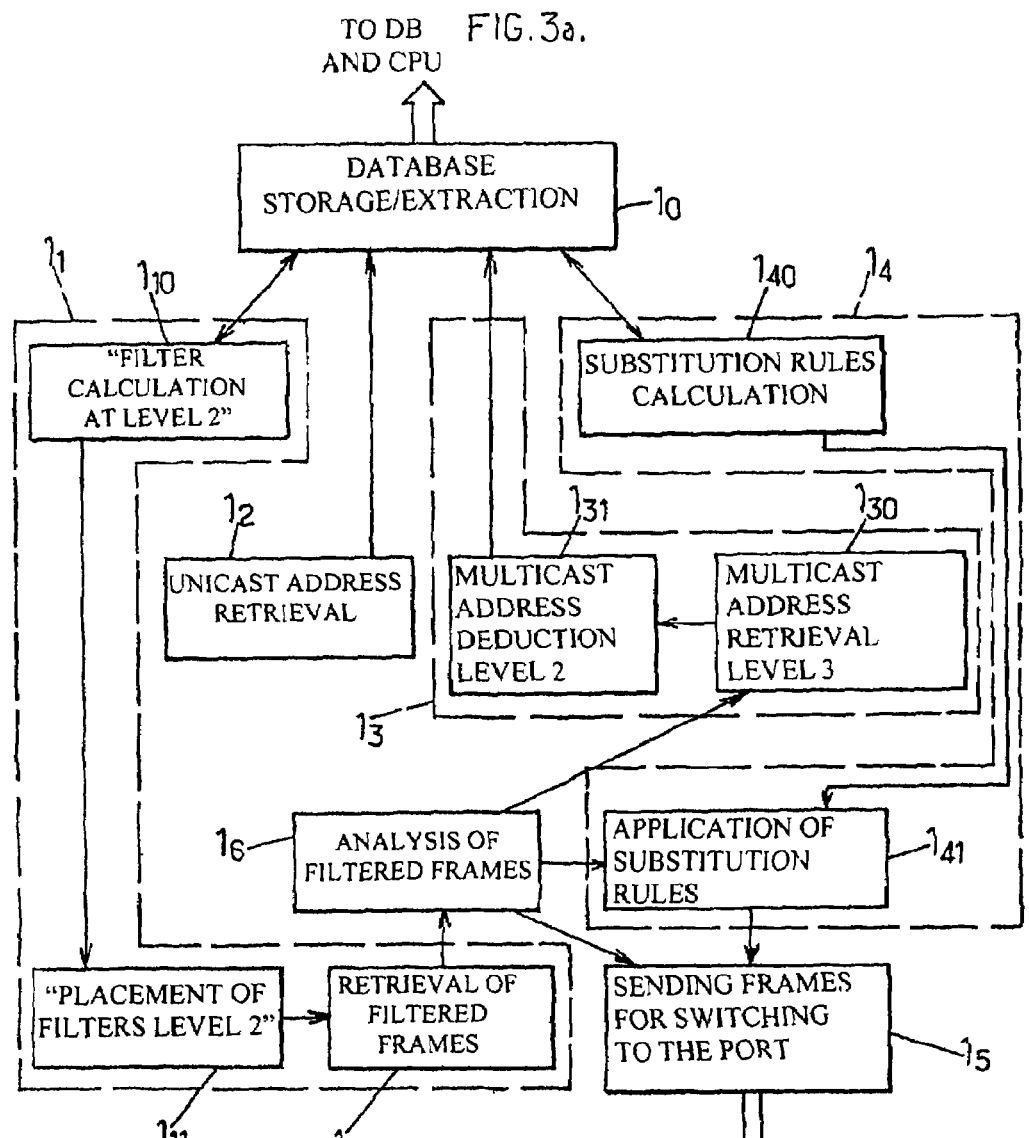

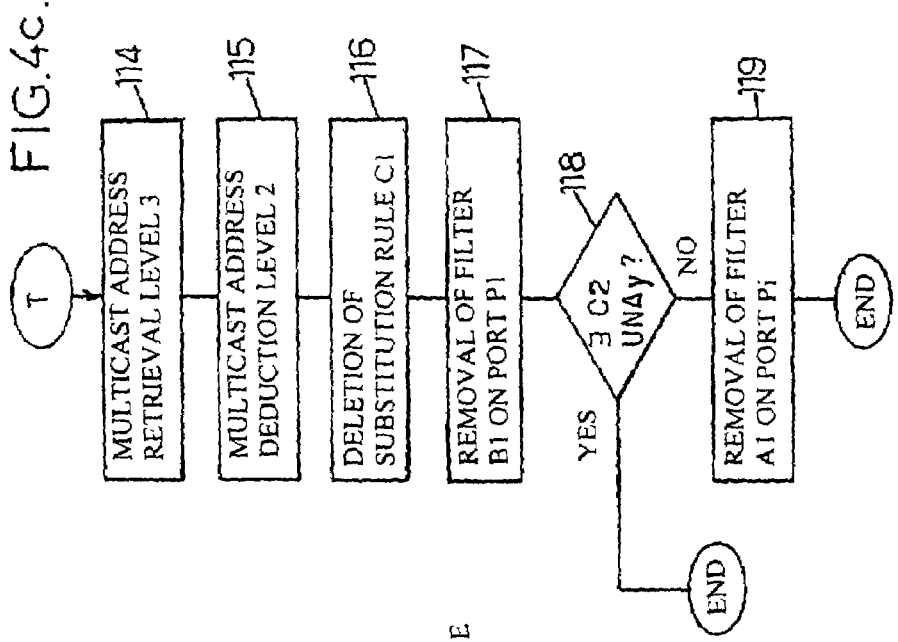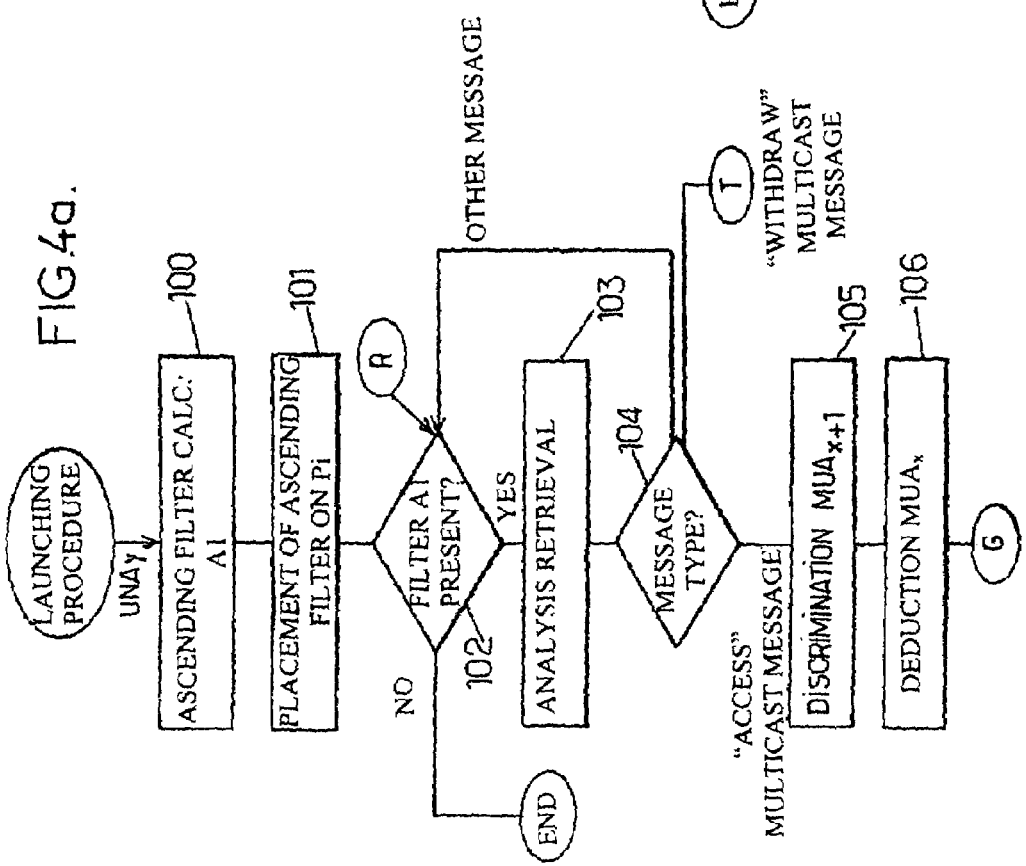

METHOD AND SYSTEM FOR TRANSMITTING A MULTICAST STREAM OVER A DATA EXCHANGE NETWORK

This application claims priority from PCT/FR2006/000804 filed Apr. 12, 2006, which claims priority from French Application FR 05 03853, filed Apr. 18, 2005, both of which are hereby incorporated by reference in their entirety.

FIELD OF DISCLOSURE

The invention relates to a method and a system for transmitting a multicast stream over physical links, in particular unreliable links, such as the links provided by shared networks, comprising WIFI links as defined by the IEEE 802.11 or 802.15(a) standards or the links formed over PLC home power line communications, defined by the Home Plug consortium.

BACKGROUND

Currently, a multicast receiver terminal wishing to receive a given multicast stream, for example delivered by a multicast server, registers in advance with a multicast group. This registration allows this terminal, or a multicast receiver address representing this latter, to be inserted into a multicast tree structure, to which all the members of the same multicast group belong. As a result of the multicast tree structure previously mentioned, formed by the connection of all its members to a network, all the members of a multicast group receive the same multicast transmission of information. This transmission can be defined as a point/multi-point transmission.

Also as a result of this type of transmission, the multicast transmissions are not acknowledged by the receiver terminals which receive them. In fact, if each receiver terminal had to acknowledge each packet of data that it received in a multicast stream, there would be a very large increase in the volume of data to be transmitted, and very often, a prohibitively heavy load on the network supports of such a transmission.

The absence of acknowledgement of the multicast type data received is not a problem in itself, when the physical transport link is very reliable. This is the case for example when the physical link is an Ethernet cable.

On the other hand, when the physical transport link is not reliable, for example for a wireless link, certain multicast applications have proved to be very sensitive to the loss of data packets. This is in particular the case of audio and/or video multicast applications, which can be seriously affected in this way and thus can see their service quality drop unacceptably.

To date, various solutions have been suggested to remedy a drawback of this kind.

These solutions essentially propose a multicast acknowledgement procedure by transmission of messages of acknowledgement at level 2 or level 3 of the OSI (Qpen System Interconnection) model. It will be recalled that the OSI model mentioned previously defines a framework for implementing network communications protocols comprising 7 levels, the bottom level, level 1, corresponding to the physical layer and the top level, level 7, to the application layer dedicated to the user. For a more precise definition of the OSI model, reference can easily be made to the internet site at http://www.webopedia.com/quick-ref/OSI-layers.asp.

Among the above mentioned solutions, Patent Application US 2005 002365 proposes to make the diffusion of multicast information more reliable for unreliable links, such the as a wireless link according to the IEEE 802.11 standard. The proposed system relates to the OSI model layer of level 2 but the method described requires the implementation of new modules for the acknowledgement of multicast frames, not only in the multicast transmitter but also in each multicast receiver terminal.

Patent Application US 2003 206549 also suggests a way of making the broadcast of multicast information more reliable for unreliable links, such as wireless links according to the IEEE 802.11 standard, the proposed system however concerning level 3 of the OSI model layer. The method described consists of establishing an additional channel between the multicast receiver terminal and the multicast server, by means of which the receiver terminal is capable of requesting multicast information which is expected but not received. The multicast server can then proceed with the multicast rebroadcast of the required information. The method described by this document clearly overloads the server and the receiver terminals, which by definition receive all the rebroadcast. Moreover, the reliability process introduced by level 3 of the OSI model introduces an additional delay on multicast frame loss detection. This system also requires the implementation of new modules in the multicast transmitter and in each receiver terminal.

Finally, techniques have been proposed with the aim of avoiding propagation of multicast data packets in GPRS and/or UMTS mobile telephony network nodes, by conversion of multicast packets into unicast packets. This operation is implemented by a network appliance denoted as GGSN containing embedded software executing IGMP proxy functions. This latter intercepts and interprets the IGMP messages and maintains a correspondence table between the IP addresses of the multicast receiver terminals and the IP addresses of the multicast groups with which these receiver-terminals are registered. When a packet intended for a multicast group reaches the GGSN, the IGMP proxy verifies in its table the existence of one or more terminals each designated by a destination unicast IP address and where this is affirmative, replaces the multicast destination IP address of the packet with the unicast IP address of each of the multicast receiver terminals.

A function of this kind described in recommendation 3GPP TS29.061 cannot be implemented easily, as the IGMP proxy function is a heavy consumer of processing resources. The suggested solution mentioned previously can therefore in no way be implemented in network appliances which are not equipped with a router function, such as access points or home gateways in bridged mode for example.

SUMMARY

A subject of the present invention is the implementation of a method and a system for transmitting a multicast stream in a data exchange network, i.e., over any link, in particular any unreliable link such as an IEEE 802.11 and 802.15 or CPL type link where reliability is likely to be reduced by the radio interferences respectively of the low-voltage supply network.

In particular, a subject of the present invention is the implementation of a system for transmitting a multicast stream, in the form of a specific module implemented in the transmission path, at the same place where the multicast transmission passes from a reliable link such as an Ethernet network link, to an unreliable link, in particular at an access point also designated a gateway.

Another subject of the present invention is in particular, the implementation of a method and a system for transmitting a multicast stream by conversion of a multicast stream at the link level, also designated the frame level, of the of the OSI or TCP/IP model, to a unicast stream at the link level of the same model, making it possible to benefit from the acknowledgement mechanisms for frame transfer at the link level inherent in unicast transfers, and thus make the transfer of information conveyed by the multicast stream more reliable.

Another subject of the present invention is also the implementation of a method and a system for transmitting a multicast stream in a unicast stream at the link level, leaving unchanged the transfer addresses and protocols at the levels higher than the link level of the OSI or TCP/IP model, the method and the system which are the subject of the invention thus being shown to be totally transparent for the current servers and multicast receiver terminals and totally compatible with the latter.

Another subject of the present invention is finally the implementation of a method and a system for transmitting a multicast stream in which the interceptions of multicast frames necessary to their implementation are carried out by filtering at the link level and their retransmission along one or more unicast streams by address redirection, the method and the system, which are the subjects of the present invention thus not requiring the implementation of any routing process and thus capable of being implemented in network appliances having little network intelligence such as access points, gateways or switches.

The method for transmitting a multicast stream over a data exchange network, which is a subject of the present invention, is remarkable in that it consists at least, at an access point of this shared network, of analysing the multicast stream by data frames, in order to detect the multicast address at the link level of this multicast stream, substituting in each data frame for said multicast address at the link level a unicast address at the link level of at least one node of this shared network, in order to generate a substituted multicast frame, to transmitting instead and in place of these multicast streams at least one unicast stream, a succession of substituted multicast frames, to said unicast address at the link level, which makes it possible to benefit from the acknowledgement mechanism for unicast stream transmission frames, for the succession of substituted multicast frames.

The system for transmitting a multicast stream over a data exchange network, which is a subject of the invention, is implemented in an access point of a data exchange network, this access point comprising at least one plurality of input/output points, one of the input/output points being logically connected to a multicast stream server and at least one other of these input/output points being connected to a potential receiver terminal of a multicast stream, and an input/output port management software infrastructure module. This potential receiver terminal is designated in the shared network by a unicast address at the determined link level.

The system, which is the subject of the invention, is remarkable in that it comprises at least one reliability module for the transmission of a multicast stream allowing the transmission, instead and in place of any multicast stream transmitted by this multicast server, of at least one unicast stream, a succession of substituted multicast data frames in which the multicast address at the link level is substituted by the unicast address determined at the link level to this potential receiver terminal It comprises moreover a database comprising at least one permanent database containing configuration data for the reliability module and a temporary, database making it possible to maintain a multicast stream state of one or a plurality of potential receiver terminals of a multicast stream, each connected to one of the input/output points.

Moreover a subject of the invention is:

a computer program stored on a storage support for execution by a computer or by the central processing unit of a system, remarkable in that on connection of a potential receiver terminal of a multicast stream to one of the input/output ports of this system, said computer program executes at least, successively:

the calculation of an ascending filter for interception of data frames transmitted by said potential receiver terminal of a multicast stream from the unicast address at the link level of this latter;

the placing of said ascending filter on the input/output point on which said potential receiver terminal is connected; and, followed by verification of the presence of said ascending filter on said input/output port, the retrieval by interception and the analysis of the nature of at least one data frame transmitted by said potential receiver terminal; and depending on the nature of said data frame and the message transmitted by said potential receiver terminal, whether said message is a message requesting access to a multicast broadcast, the retrieval in said frame of the multicast address at a level higher than the link level of the requested multicast stream; and, the deduction and the storage, from said multicast address at a level higher than the link level, of the address at the link level of the requested multicast stream;

a computer program stored on a storage support for execution by a computer or by the central processing unit of a system, remarkable in that, for any retrieved multicast address at the link level of a multicast stream requested by a potential receiver terminal of a unicast address at the determined link level, said program executes at least, successively:

the calculation of a descending filter for interception of data frames transmitted by said multicast stream, from the retrieved multicast address at the link level;

the calculation of an address substitution rule between the multicast address at the link level and the unicast address at the link level; and, followed by verification of the presence of said descending filter on the input/output port to which said multicast server is connected, the retrieval by interception and the analysis of the destination of each data frame transmitted by the multicast stream filtered by said descending filter;

the application of said substitution rule, to the multicast address at the link level of each multicast data frame being substituted by the unicast address at the link level of said potential receiver terminal of the multicast stream, in order to generate a substituted multicast data frame;

the forwarding of each substituted multicast data frame to the switching port to which said potential receiver terminal is connected; which makes it possible to transmit each substituted multicast data frame under the unicast address at the link level of said potential receiver terminal and to benefit from the security and the reliability of transmission of the unicast protocol.

a computer program stored on a storage support for execution by a computer or by the central processing unit of a system, remarkable in that, depending on the analysis of the nature of at least one data frame transmitted by a potential receiver terminal of the address of a multicast stream, whether the message conveyed by said frame is a message ending access to said multicast stream, said program executes at least, successively:
the retrieval in said frame of the multicast address at a level higher than the link level of the requested multicast stream;
the deduction, from said multicast address at a level higher than the link level, of the address at the link level of the requested multicast stream
the deletion of the corresponding substitution rule;
the suppression of the descending filter on the input/output port to which said server multicast is connected; and, followed by the verification of the non-existence of a specific rule relative to the unicast address at the link level of said potential receiver terminal,
the suppression of the ascending filter on the input/output port to which said potential receiver terminal is connected.

The method, the system for transmitting a multicast stream and the computer program products which are subjects of the invention are of use in the implementation of data exchange networks such as shared networks of the following types: local area networks, wireless home networks according to the IEEE 802.11 standard or by powerline communication PLC for example.

BRIEF DESCRIPTION OF THE DRAWINGS

They will be better understood on reading the description and referring to the drawings, in which:

FIG. 2b represents, by way of illustration, a detail of the implementation of the step of substituting an address executed by the method which is a subject of the invention illustrated in FIG. 1;

FIG. 3a represents, by way of illustration, a block diagram of a system for transmitting a multicast stream which is a subject of the invention, implemented in an access point;

FIG. 3b represents, by way of illustration, a block diagram of a module for the reliability of the transmission of a multicast stream which is part of a system which is a subject of the invention, as represented in FIG. 3a;

FIG. 4a represents, by way of illustration, a flow chart of the steps implemented by the system and the module for the reliability of the transmission of a multicast stream represented in FIGS. 3a and 3b, during the launching of a request for access to a multicast stream by a potential receiver terminal of a multicast stream;

FIG. 4b represents, by way of illustration, a flow chart of the steps implemented by the system and the module for the reliability of the transmission of a multicast stream represented in FIGS. 3a and 3b, during the processing of multicast frames in a multicast stream of which the address of the multicast group has been recognised in accordance with the steps described with reference to with FIG. 4a;

FIG. 4c represents, by way of illustration, a flow chart of the steps implemented by the system and the module for the reliability of the transmission of a multicast stream represented in FIGS. 3a and 3b, during the launching of a request for ending access to a multicast session by a potential receiver terminal of a multicast stream;

A more detailed description of the method for transmitting a multicast stream over a shared network conforming to the subject of the present invention will now be given with reference to FIG. 1 and the following figures.

DETAILED DESCRIPTION OF EMBODIMENTS

Figure 1:
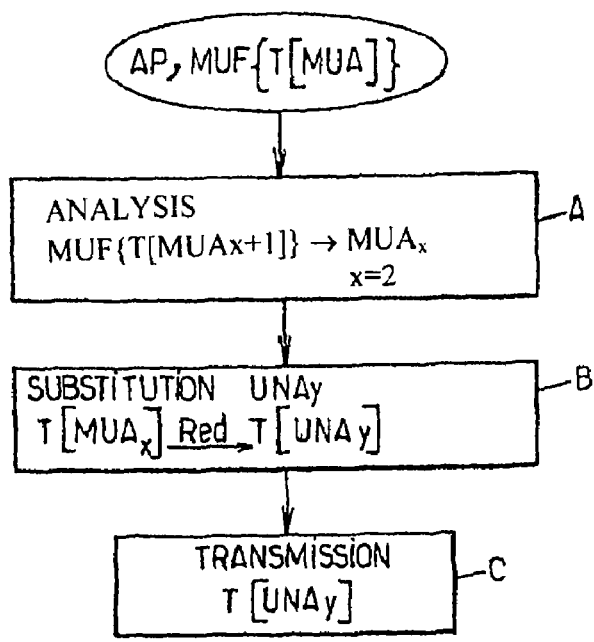
FIG. 1 represents, by way of illustration, a flow chart of the essential steps for the implementation of the method for the transmission of a multicast stream over a shared network, which is a subject of the present invention.

With reference to FIG. 1 mentioned previously, it is shown that the method for transmitting a multicast stream over a data exchange network, which is a subject of the invention, is implemented at the level of an access point AP, of a gateway or a switch as described previously in the description, these elements, do not have significant network intelligence, no network intelligence resource such as a routing resource being necessary for the implementation of the method which is a subject of the present invention.

Let us consider, at the level of the access point AP mentioned previously, a multicast stream constituted by a succession of multicast frames, each multicast frame denoted as T[MUA] being at least linked to a multicast address MUA such as the address of the multicast group under which the broadcast of the multicast stream is carried out. Taking account of the previous considerations, the multicast stream is then as:
MUF(T[MUA]).

With reference to FIG. 1 mentioned previously, the method which is a subject of the invention consists, at a step A, of analysing the multicast stream by data frames in order to detect the multicast address at the link level of the multicast stream considered.

Generally, by multicast stream is meant not only any descending multicast stream transmitted by a multicast server MS to a potential receiver terminal $T_y$ of the multicast stream considered as well as any succession of frames transmitted in the ascending direction of the potential receiver terminal $T_y$ mentioned previously to an access point AP or more generally to any multicast broadcast source, such as a multicast server MS. The ascending and descending frames mentioned previously have in common the multicast destination address MUA indicated previously.

At step A of FIG. 1, the step consisting of analysing the multicast stream is represented by the relationship:
$MUF\{T[MUA_{x+i}]\} \rightarrow MUA_x$.

Generally it is shown that the analysis mentioned previously is executed at the link level for detecting the multicast address at the link level, i.e. the address $MUA_x$ for x=2, x=2 being basically designated level 2 of the layer of the OSI model or the corresponding TCP/IP model.

With reference to step A of FIG. 1 it is shown that the detection of the multicast address at the link level is in general carried out from the address of each multicast frame at the level higher than the link level these frames being denoted as:
$T[MUA_{x+i}]$
as will be described subsequently in the description, x+1 designating the level higher than the link level x of the multicast address MUA considered.

Step A is then followed by a step B consisting of substituting in each data frame for the multicast address at the link level a unicast address at the link level of at least one node of the data exchange network, in order to generate a substituted multicast frame.

At step B of FIG. 1, for a unicast address at the link level of a given node, address denoted as $UNA_y$, the node of the shared network being basically constituted by the terminal $T_y$ mentioned previously, the substitution operation is represented by the symbolic relationship:

$$T[MUA_x] \xrightarrow{Red} T[UNA_y]$$

With reference to step B mentioned previously of FIG. 1, it is understood that the substituted multicast frame $T[AA_y]$, by address redirection Red for example, is non other that the previous multicast frame in which the multicast address at the link level $MUA_x$ has been replaced by the unicast address at the link level of the node of the shared network, i.e. of the terminal $T_y$.

Operation B is then followed by operation C consisting of transmitting instead and in place of the multicast stream at least one unicast stream, this latter being constituted by a succession of substituted multicast frames, the unicast stream being transmitted to the unicast address at the link level, i.e. to the node of the shared network considered.

Naturally, it is understood that a frame of a multicast stream $T[MUA_x]$ can of course be substituted by a plurality of substituted multicast frames and finally a plurality of unicast streams transmitted under the unicast address $UNA_y$ of each of the nodes having access to the original multicast broadcast.

The operating method of the method which is a subject of the invention then makes it possible to benefit from the acknowledgement mechanism for frames of the transmission of a unicast stream for each of the nodes of the shared network or terminals of those concerned with the multicast broadcast for the succession of substituted multicast frames.

As mentioned in step A of FIG. 1, the link level is constituted by level 2 of the layers of the OSI or TCP-IP model for the definition of the multicast and unicast stream.

By implementation of the method which is the subject of the present invention it is understood that this latter is only involved at the link level, i.e. at the level of the multicast frames respectively unicast ensuring the link between transfer points of the frames mentioned previously and in no event at the higher level of the successive layers of the OSI or TCP/IP model, which makes it possible to ensure the compatibility of the method which is a subject of the present invention with all the applications using such a protocol.

Generally, it is shown that the step consisting of substituting at step B of FIG. 1 the multicast address at the link level with a unicast address at the link level can be advantageously carried out by filtering and redirection of the address of the received data frames comprising the multicast address at the link level to the unicast address at the link level of the node of the shared network considered.

A more detailed description of a non limitative preferential implementation of the analysis step A implemented by the method which is the subject of the present invention, as illustrated in FIG. 1, will now be given with reference to FIG. 2a.

Figure 2A:
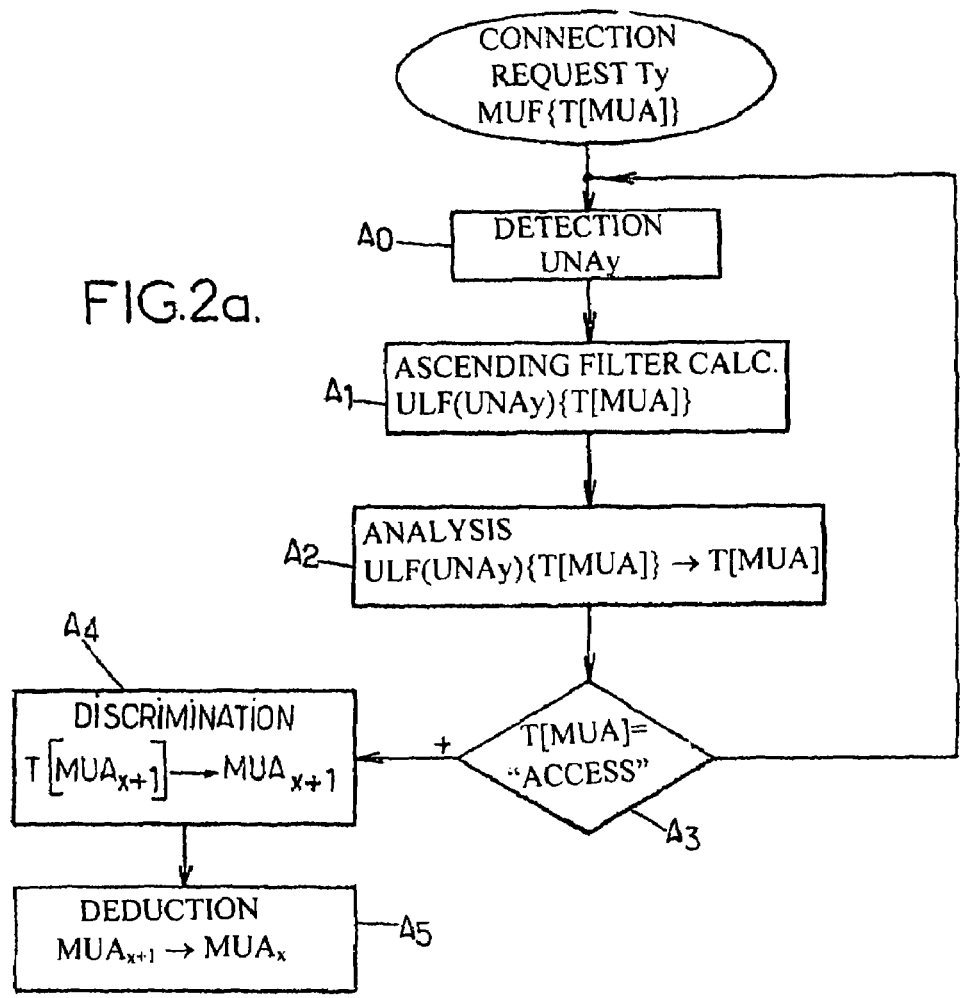
FIG. 2a represents, by way of illustration, a detail of the implementation of the step of analysing the multicast stream executed by the method which is a subject of the invention illustrated in FIG. 1.

With reference to FIG. 2a, let us consider, in first place, the connection of a potential receiver terminal of a multicast stream, denoted as terminal $T_y$, this terminal being basically able to execute a request for a multicast stream to a multicast group address MUA for example.

Under these conditions, the multicast stream is denoted as MUF(T[MUA]).

Generally, and in order to explain the process for the implementation of the method which is a subject of the present invention, it is shown that any terminal $T_y$ connecting to a data exchange network at any access point AP is considered as a potential receiver terminal of a multicast stream, insofar as where this terminal is a priori capable of transmitting a request for access to a multicast stream i.e. to a multicast stream group address MUA mentioned previously.

With reference to FIG. 1 mentioned previously, step A consisting of analysing the multicast stream in order to detect the multicast address at the link level consists at least, as represented in FIG. 2a, of a step $A_0$ to detect the unicast address at the link level of a potential receiver terminal requesting access to the multicast stream considered. Step $A_0$ mentioned previously can be executed during the connection of the potential receiver terminal $T_y$ to the access point AP via the corresponding data exchange network, the unicast address of the terminal $T_y$ being denoted as $UNA_y$ and designating the corresponding unicast address of the terminal in the data exchange network.

Step $A_0$ is followed of a step $A_1$ consisting of calculating an ascending filter for the interception of data frames transmitted by the potential receiver terminal $T_y$ from the unicast address at the link level.

The ascending filter is denoted for this reason:
ULF($UNA_y$)(T[MUA]}

From the preceding annotation of the ascending filter it is understood that the ascending filter mentioned previously is intended to intercept any message requesting multicast access and in particular any multicast frame transmitted from the unicast address of the terminal $UNA_y$. Each multicast frame requesting access comprises the multicast group address MUA to which the terminal $T_y$ wishes to have access and is denoted for this reason T[MUA], this address not being known before interception.

The ascending filter thus basically allows the interception of any multicast frame T[MUA] issued by the terminal $T_y$ to the unicast address $UNA_y$.

Step A1 is then followed by a step $A_2$ consisting of analysing at least one data frame intercepted by the ascending filter mentioned previously in order to determine the type of multicast session messages transmitted by the terminal $T_y$.

The analysis step mentioned previously executed at step $A_2$ of FIG. 2a is represented by the symbolic relationship
ULF($UNA_y$){T[MUA]}→T[MUA].

By the interception and analysis operation mentioned previously, it is understood that the ascending filter therefore allows interception of the frame T[MUA] and execution of the analysis operations hereafter. The object of the analysis operations is to demonstrate the existence of a multicast session message of the accession type. This analysis operation is represented in FIG. 2a by the test executed at step A3 by the test relationship:
T[MUA]="Access".

Verification of the preceding equality executed at step $A_3$ makes it possible to verify that the message supported by the multicast frame T[MUA] is a multicast session message of the accession type designated by "Access".

If there is a negative response to the test at step $A_3$, the message supported by the multicast frame is not a message of accession type to a multicast session, the analysis method then consists of a return to the step of detecting the unicast address of any terminal of address $UNA_y$ at step $A_0$ mentioned previously.

On the other hand, if the response is positive to the test at step $A_3$, the message supported by the multicast frame T[MUA] is a multicast session message of accession type, the step of test $A_3$ is followed of a step $A_4$ consisting of discriminating the multicast address of level higher than the link level of the multicast stream requested by the terminal $T_y$.

Discrimination of the multicast address of level higher than the link level is represented by the relationship at the step $A_4$:

$T[MUA_{x+1}]\} \rightarrow MUA_{x+1}$.

This discrimination operation is executed at the level higher than link level, i.e. finally, according to the OSI or corresponding TCP/IP model, on level 3 of the latter, i.e. on the packet level, the discrimination of the address $MUA_{x+1}$, of level 3, in the case of the implementation of the method which is a subject of the invention being easily executed at the packet level.

Step A4 for discrimination mentioned previously is then followed by a step $A_5$ for deducing the multicast address of link level $MUA_x$ from the multicast address of level higher than the link level $MUA_{x+1}$.

At step A5 of FIG. 2a, this operation is represented by the relationship:

$MUA_{x+1} \rightarrow MUA_x$.

A more detailed description of step B consisting of substituting at the multicast address link level a unicast address link level implemented by the method which is a subject of the present invention, as illustrated in FIG. 1, will now be given with reference to FIG. 2b.

Following the execution of step A of FIG. 1, in particular in accordance with the steps described previously with reference to FIG. 2a, we have not only the unicast address $UNA_y$ of the terminal $T_y$, but also of the multicast address at the link level of the multicast stream requested and which normally should be received by the potential receiver terminal making a request $T_y$.

With reference to FIG. 2b, the method which is a subject of the invention for executing the substitution mentioned previously then consists at least, at a step $B_0$, of calculating a descending filter for interception of data frames transmitted by the multicast stream, from the multicast address at the link level.

At step $B_0$ of FIG. 2b, the descending filter for intercepting data frames is denoted:

$DLF(MUA_x)$.

It is understood in particular that the descending filter mentioned previously is intended to intercept any frame of a multicast stream transmitted by a multicast broadcast source, such as a multicast server for example, under a group multicast address, the address $MUA_x$ at the link level.

Step B0 is then followed by a step B1 consisting of calculating a rule for substituting the multicast address at the link level with a unicast address at the link level.

At step $B_1$ of FIG. 2b, the substitution rule mentioned previously is denoted as:

$SR(MUAx,UNAy)$.

Step $B_1$ is then followed by a step $B_2$ for the analysis of at least one data frame of the multicast stream intercepted by the descending filter mentioned previously. At the analysis step $B_2$ mentioned previously, the so-called analysis operation is represented by the symbolic relationship:

$DLF(MUA_x)\{MUF(T[MUA_x]\}\}$.

By the above symbolic relationship, it is understood that the descending filter applied to the multicast stream $MUF(T[MUA_x]\}$, i.e. the succession of frames transmitted under the MUAx group address allows the corresponding frames to be intercepted and analysed in order to obtain the successive frames $T[MUA_x]$ which are part of the multicast stream.

The analysis step $B_2$ is then followed by a step $B_3$ consisting of applying the substitution rule calculated at step $B_0$. For each multicast data frame intercepted, a substituted multicast data frame is generated.

At step B3 of FIG. 2b, the operation of application of the substitution rule $SR(MUA_x,UNA_y)$ is represented by the symbolic relationship:

$T[MUA_x] \rightarrow T[UNAy]$.

A more detailed description of a system for transmitting a multicast stream over a data exchange network, in accordance with the subject of the present invention, will now be given with reference to FIGS. 3a, 3b, and the following figures.

Generally, it is shown that the system for transmitting a multicast stream over a data exchange network, which is the subject of the present invention is implemented in an access point AP in a data exchange network, the concept of an access point including the concept of a home gateway, the concept of a switch giving access to the IP network for example, from a network such as a shared network.

As described non-limitatively with reference to FIG. 3a, the access point AP comprises at least one plurality of input/output ports denoted $P_1 \ldots P_i \ldots P_1$ and a software infrastructure module for managing the input/output ports denoted SPIM. The software infrastructure module for managing the input/output ports mentioned previously is connected by BUS to each of the input/output ports mentioned previously.

Apart from the standard elements mentioned previously, the access point advantageously comprises a central processor unit CPU and a working memory RAM interconnected by a bus to the input/output ports mentioned previously using the software infrastructure module for managing the input/output ports SPIM. The central processor unit and the working memory RAM are standard elements and for that reason are represented by dashed lines on the drawing of FIG. 3a.

Moreover, one of the input/output ports, non-limitatively port $P_1$, is logically connected to a multicast stream server MS by a wide area network, the logic connection extending from any connection using the IP protocol for example. At least one other input/output port, the port Pi by way of a non-limitative example, is connected to a potential receiver terminal of a multicast stream, the terminal $T_y$. The potential receiver terminal $T_y$ is designated on the shared network by its unicast address at the link level, the $UNA_y$ address mentioned previously in the description. This address is an address linked to the shared network configuration only and is dependant only on the shared network link mode used and the terminal $T_y$ itself.

As shown in FIG. 3a, the system for transmitting a multicast stream over a data exchange network which is the subject of the invention moreover remarkably comprises, implemented in the access point AP considered, a reliability module 1 for the transmission of multicast streams which makes it possible to transmit, instead and in place of any multicast stream transmitted by the multicast server of at least one unicast stream to the terminal $T_y$, making a request. The unicast stream considered is in fact constituted by a succession of substituted multicast data frames, as described previously in the description, in which for the multicast address at the link level, $MUA_x$, is substituted the unicast address at the determined link level $UNA_y$ of the terminal $T_y$ as described previously in the description.

The system which is the subject of the invention, as represents in FIG. 3a, moreover comprises a database DB comprising at least one permanent database containing configuration data for the reliability module and a temporary database allowing maintenance of the state of one or a plurality of potential receiver terminals such as the terminal $T_y$, capable of receiving a multicast stream, each of the terminals mentioned previously being connected to one of the input/output ports.

FIG. 3a shows the database DB integrated with the access point AP. In this situation, the database DB can then be constituted on a hard disk directly integrated with the access point AP. This situation can be found when the access point is a gateway such as a home gateway for example or a larger installation in the context of a company network.

More specifically, it is shown that the database DB can be implemented outside the access point AP. In this situation, the database DB can be linked to the company network, for example directly or using an input/output port as mentioned previously.

A more detailed description of a reliability module implemented in an access point AP, as described in FIG. 1, will now be given with reference to FIG. 3b.

With reference to the figure mentioned previously, it is shown that the reliability module 1 for the transmission of a multicast stream over a data exchange network, in accordance with the subject of the present invention, can comprise at least, advantageously, a module $1_0$ for the storage/extraction of data of the database DB, the module $1_0$ for storage being advantageously connected by BUS to the database DB and to the central processor unit CPU for example, as represent in FIG. 3a.

Moreover, the reliability module 1 comprises, as represented in FIG. 3b mentioned previously, directly connected to the storage/extraction module $1_0$, a sequence $1_1$ for the filtering and retrieval of multicast frames from the multicast frames transmitted by the software infrastructure for managing the input/output ports.

The sequence $1_1$ for the filtering and retrieval of frames, from the multicast frames transmitted by the software infrastructure for managing the input/output ports, allows the operation of filtering and retrieval of the frames mentioned previously to be carried out.

Moreover, a unicast address retrieval module $1_2$ is directly connected to the data storage/extraction module $1_0$ of the database DB. The unicast address retrieval module $1_2$ mentioned previously makes it possible to retrieve the address declared during the connection of the potential receiver terminal $T_y$ of the multicast stream at the input/output port Pi for example.

A sequence $1_3$ for the deduction of the multicast address at the link level is also connected directly to the storage/extraction module $1_0$. The sequence $1_3$ for deduction of the multicast address at the link level makes it possible, starting from the multicast address at the level higher than the link level, i.e. the address $MUA_{x+1}$ contained in the multicast frame, in order to obtain the deduction of the multicast address at the link level $MUA_x$ as mentioned previously in the description.

Finally, a sequence $1_4$ for the calculation and application of substitution rules for the multicast addresses at the link level with a unicast address at the link level is also provided and directly connected to the module $1_0$ for storage/extraction of data from a database.

Sequence $1_1$ for the filtering and retrieval of multicast frames from the multicast frames transmitted by the software infrastructure for managing the input/output ports SPIM comprises a calculation module $1_{10}$ of the filters at the link level. This calculation module makes it possible calculate and install filters at the link level, level 2 filters, which are then applied at the level of the appropriate input/output ports. The calculation module $1_{10}$ of the filters at the link level allows storage of information relating to the filters in the database DB, using the storage/extraction module $1_0$.

Moreover, the sequence $1_1$ for the filtering and retrieval of multicast frames comprises a module $1_{11}$ for placing filters at the link level. The module mentioned previously talks with software modules of the software infrastructure for managing the input/output ports SPIM, so as to place the filters at the link level defined by module $1_{10}$ for calculation of the filters at the link level on the appropriate input/output ports Pi or to remove the filters mentioned previously at the end of a session, as will be described later in the description.

Following a placement of the filters at the link level on the appropriate input/output ports, the software infrastructure for managing the input/output ports SPIM is then able to send to a retrieval module for the filtered frames $1_{12}$, the frames for which the filter is established, filter at the link level, by the calculation module $1_{10}$ for filters at the link level is then recognized.

The retrieval module $1_{12}$ for the filtered frames allows retrieval of the frames sent by the software infrastructure for managing the input/output ports SPIM and sends the retrieved, i.e. filtered, frames mentioned previously to a module $1_6$ for analysis of the retrieved filtered multicast frames, provided by the filtering and retrieval sequence of multicast frames $1_1$.

The unicast address retrieval module $1_2$ allows retrieval of the unicast address provided during the connection of the terminal $T_y$, and the launch of the procedure for the terminal Ty mentioned previously. The module $1_2$ allows this information to be stored in the database DB using the database storage/extraction module $1_0$.

The sequence $1_3$ for the deduction of the multicast address at the link level, starting from the multicast address at the level higher than the link level contained in each multicast frame, comprises in fact a module $1_{30}$ for the retrieval of the multicast address at the level higher than the link level, i.e. at level 3. The address retrieval module $1_{30}$ allows retrieval of the multicast address at the level higher than the link level contained in the multicast message and transmits the address of the level higher than the link level mentioned previously to a module $1_{31}$ which is part of the sequence $1_3$ for deduction of the multicast address at the link level. The module $1_{31}$ makes it possible for the multicast address to be deduced at the level higher than the link level, the multicast address at the link level, and allows this information to be stored in the database DB using the storage/extraction function of the database executed by the module $1_0$.

The sequence $1_4$ for the calculation and application of substitution rules for unicast addresses at the link level to the address at the link level comprises, as shown in FIG. 3b, a module $1_{40}$ for calculation of the substitution rules. The module $1_{40}$ makes it possible to form the substitution rules which allow substitution of the multicast addresses at the link level by unicast addresses at the corresponding link level. The rules established by the module $1_{40}$ mentioned previously are transmitted to a module $1_{41}$ which is part of the sequence $1_4$ for the calculation and application of the rules for address substitution. The module $1_{41}$ is a module for applying the substitution rules. The module $1_{41}$ mentioned previously thus receives from the module for analysis of the filtered frames $1_6$ a frame accompanied by the identifier of the corresponding filter transmitted by the module $1_6$ for the analysis of the retrieved filtered multicast frames provided by the sequence for the filtering and retrieval of the multicast filtered frames. The module $1_{41}$ makes it possible to apply the substitution rules defined by the module $1_{40}$ for the calculation of substitution rules and thus allows a substituted multicast frame to be generated as described previously in the description.

Finally, a module $1_5$ for sending frames for switching to the corresponding input/output port $P_i$ is provided. When in particular the substituted multicast frame has been established by the module $1_{41}$ for the application of substitution rules, this frame is sent by the latter to module $1_5$ for sending the frames for switching to the port. The module $1_5$ mentioned previously then forwards the substituted multicast frame to the software infrastructure for managing the input/output ports SPIM, to ensure the switching of the frame to its final destination, i.e. to the address $UNA_y$, unicast address of the terminal $T_y$ connected to the port $P_i$.

As regards the module $1_6$ for analysing filtered frames, it is shown that the latter is in direct relationship with the multicast address retrieval module $1_{12}$ from which it receives the multicast filtered frames but also in relationship with the multicast address retrieval module $1_{30}$ at the level higher than the link level, with the substitution rules application module $1_{41}$ and finally with module $1_5$ for sending the frames for switching to the appropriate input/output port $P_i$.

Under these conditions, and in operation, module $1_6$ for analysing the retrieved filtered multicast frames at least ensures:
  either forwarding the retrieved filtered frame to the frame sending module $1_5$ for switching unchanged to the input/output port $P_i$ to which the potential receiver terminal of a multicast stream $T_y$ is connected; this situation occurs when the multicast frame intercepted is an ascending frame, originating from the terminal $T_y$;
  or copying the filtered frame mentioned previously, the transmission of the copy to the sequence for the deduction of the multicast address at the link level and in particular to the module $1_{30}$ for the retrieval of the multicast address at the level higher than the link level, during for example, a new connection and an access to a multicast stream for which no substitution rule has yet been calculated by the module $1_{40}$ for the calculation of the substitution rules. The address deduction sequence $1_3$ and in particular modules $1_{30}$ and $1_{31}$ which are part of the latter then make it possible, from the multicast address retrieval at the level higher than the link level, to deduce the multicast address at the link level and to store this latter using the storage/extraction module $1_0$ in the database DB;
  or also sending the retrieved filtered frame mentioned previously to the function and the module $1_{41}$ for the application of substitution rules, when the analysis of the filtered frames carried out by the module $1_6$ shows that the multicast address at the link level $MUA_x$ is already known for the unicast address at the link level $UNA_y$ considered, it is then possible to carry out the application of the substitution rule by the module $1_{41}$ directly, because as the substitution rule is known, intervention of the calculation module $1_{40}$ for the substitution rules is not necessary.

A more detailed description of a process for the implementation of the method which is the subject of the present invention, thanks to the system and the reliability module for a multicast stream in a data exchange network described with reference to FIGS. 3a and 3b mentioned above, will now be given with reference to FIGS. 4a to 4c.

Generally, it is shown that the terminal $T_y$ contains a software application for which the requested multicast stream is intended. The final user of the terminal mentioned previously talks with the multicast application using a human-machine interface in a standard fashion.

For the implementation of the mentioned previously method and in particular, the method and system for transmitting a multicast stream over a data exchange network which are subjects of the present invention, a gateway or an access point AP designates an element allowing the passage of data between physical links of different technologies. Within the framework of the implementation of the method and system for transmitting a multicast stream over a shared network which is a subject of the invention, it is shown that an access point AP allowing passage between an Ethernet physical link and a wireless physical link of the WIFI type is considered as a gateway in the broadest sense of the term. If appropriate, a gateway can also have functions linked to applications such as the supply of address functions or others.

Figure 4B:
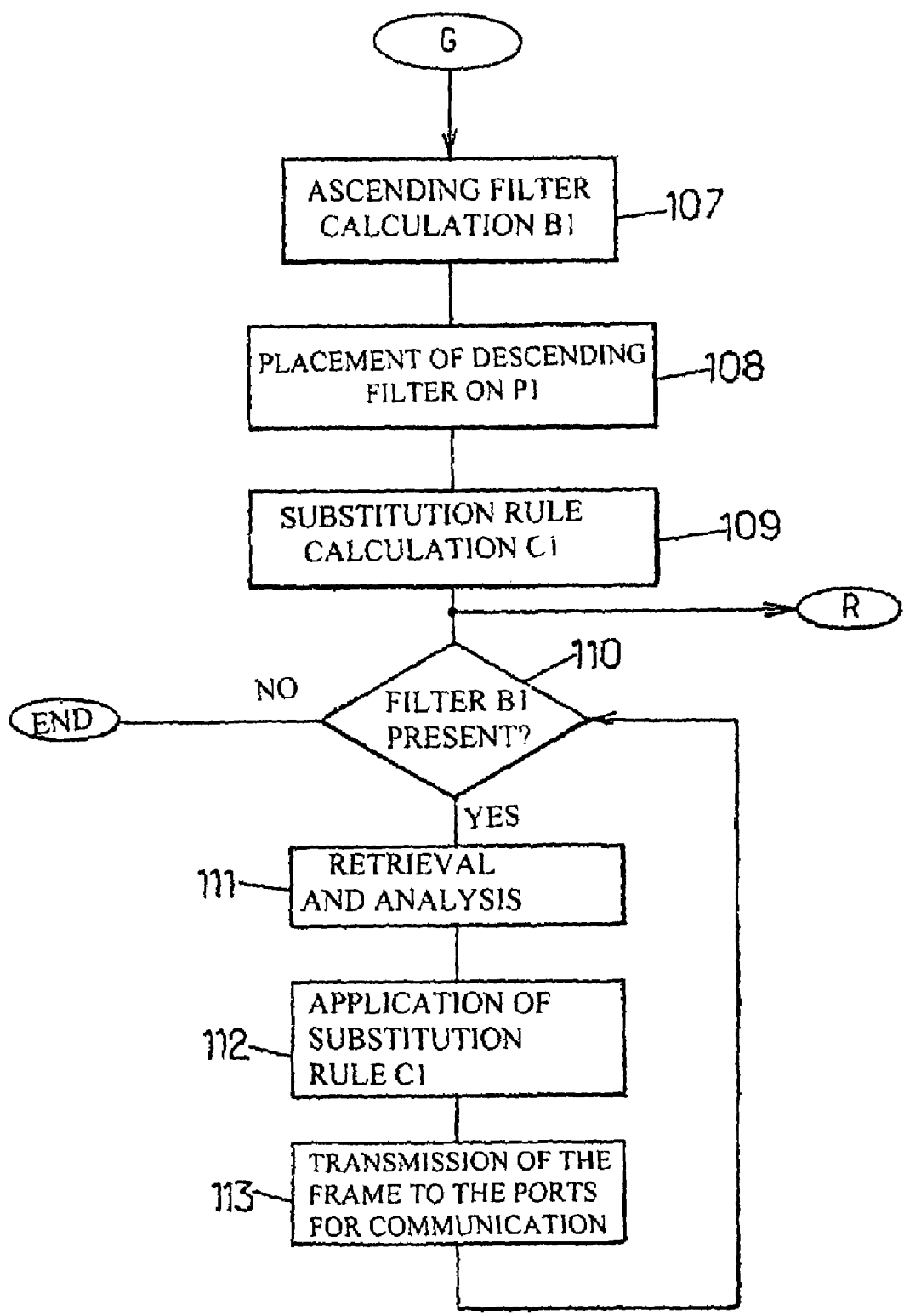

Within the framework of the implementation of the method and system which are the subjects of the present invention, the name of multicast/unicast procedure at the link level is given to the procedure followed by the system and in particular the reliability module 1 for transmission of a multicast stream over a shared network, preferentially but non-limitatively as shown with reference to the FIGS. 4a to 4c mentioned previously.

With reference to FIG. 4a, it is shown that launching the procedure relates to launching the multicast/unicast procedure at the link level.

According to the configuration file contained in the database DB, the reliability module 1 for a multicast stream in a shared network can:
  either launch the multicast/unicast procedure at the link level as from the start-up of the gateway for all the terminals which connect thereto;
  or launch the multicast/unicast procedure at the link level as from the start-up of the gateway for certain terminals the identifiers of which are provided in the configuration file in the form of a list or other;
  or also establish a dialogue with the gateway applications in order to know at what moment to launch the multicast/unicast procedure at the link level and, definitively, for which connected multicast potential receiver terminal, each of the latter being identified by its unicast address at the link level.

By way of non-limitative example it is shown that, prior to the multicast broadcast, the potential receiver terminal $T_y$ can signal to the gateway that it is going to access to a multicast service by a signalling message. This signalling message can be transmitted using a service request application protocol, for example such as the Session Initiation Protocol (SIP). One of the gateway or the access point AP applications can then activate the reliability module 1 for the transmission of a multicast stream over a shared network and provide it with the identifier of the multicast terminal-receiver, i.e. the unicast address $UNA_y$ mentioned previously.

Definitively, the multicast/unicast procedure at the link level mentioned previously, in accordance with the subject of the present invention, is launched with, as regards parameters, at least one unicast address at the link level of at least one potential multicast receiver terminal, i.e. the address $UNA_y$, which corresponds to a Medium Access Control (MAC) address in the shared network.

Following the launch of the multicast/unicast procedure at the link level according to one of the options mentioned previously, the module $1_2$ for retrieval of unicast addresses stored in the database DB the identifier of the potential multicast receiver terminal $T_y$, i.e. its unicast MAC address $UNA_y$. The storage mentioned previously is carried out using the function of the storage/extraction module $1_0$ for the database DB.

As represented in FIG. 4a, a step 100 of calculation of the ascending filter A1 is then called by the module $1_{10}$ of the sequence 11 for calculation of the filters at the link level, the module $1_2$ thus allowing retrieval of the unicast address in order to establish an ascending filter based on the address mentioned previously. The ascending filter $A_1$ is then established to perform a filtering on the unicast source address UNA$_y$ and on any multicast destination address and is for example in the form:

filter A1=(MAC_address_source=09:88:5 E:01:99:99,
      MAC_address_destination=01:00:5E:XX:XX:XX).

Module $1_{10}$ for the calculation of filters at the link level then stores the filter mentioned previously in the database DB, which is put in correspondence in the database DB with the unicast address of the multicast receiver terminal.

Module $1_{11}$ then executes the function of placing the filter A$_1$ at a step 101 shown in FIG. 4a, i.e. placement and installation of the ascending filter on the port P$_i$, logic port of the gateway, providing the connection of the gateway to the multicast receiver terminal T$_y$.

A verification test 102 of the operational presence of the ascending filter A$_1$ can be provided.

Module $1_{12}$ for the retrieval of the filtered frames then allows at step 103 the interception of the filtered frames by the ascending filter A$_1$, frame originating from the potential receiver terminal T$_y$, which are then transmitted to the frames analysis module $1_6$. The module mentioned previously analyses the filtered frames and then makes it possible, at a step 104 to detect the type of message transmitted by the terminal Ty and, in particular, to detect the existence of a signalling message for access to a multicast session, message denoted "Access" type. When the message detected at test step 104 of FIG. 4a is neither an accession-type message to a multicast session, an "Access" message, nor an end-of-multicast-session message, message of the "Withdrawal" type, then a return to step 102 regarding the presence of an ascending filter is executed in order to follow the process for monitoring each potential multicast receiver terminal T$_y$. This operation is represented by the return loop Other message at step 102 of FIG. 4a.

On the other hand, if this is a message terminating a multicast session for the terminal T$_y$ considered to have the unicast address UNA$_y$, message of "Withdrawal" type, then a particular procedure represented by the reference T on FIG. 4a is called, which will be described later in the description.

If the message detected at test step 104 is a message of accession to a multicast session, "Access" message, then a step 105 is called under the conditions hereafter. The frame is then copied by the frame analysis module $1_6$. The original frame is sent to the module for sending frames for switching to the port, module $1_5$, which then proceeds to send the original frame to the software infrastructure for managing the ports SPIM.

The copy of the filtered frame is then sent to the multicast address retrieval module $1_{30}$ at the level higher than the link level. The message supported by the frame mentioned previously contains the multicast address at the level higher than the link level of the multicast group to which the potential multicast receiver terminal wishes to access. The address at the level higher than the link level is then extracted by the module $1_{30}$ for retrieval of the multicast address at the level higher than the link level. An example of the address at the level higher than the link level mentioned previously is the multicast IP address=239.1.2.11 for example.

Starting from the address mentioned previously, the module $1_{31}$ then makes it possible to carry out at step 106, the deduction of the multicast address at the link level from the multicast address at the level higher than the link level mentioned previously, the multicast address at the link level is that which is used by the multicast group which is considered to be authorised to receive the multicast broadcast requested by the terminal T$_y$, according to a pre-established deduction rule. In fact, an Ethernet multicast address is composed of the multicast prefix 01:00:5 E combined with the 23 last bits of the corresponding multicast IP address.

Thus, the multicast address at the link level is the MAC multicast address=01:00:5 E:01:02:0B MAC address deduced from the mentioned previously multicast address at the level higher than the link level, i.e. from the multicast IP address=239.1.2.11.

Module $1_{31}$ for deducing the multicast address at the link level then proceeds to store the multicast address at the link level in the database DB. The storage mentioned previously is carried out using the database storage/extraction module $1_0$. In the database DB mentioned previously, the deduced multicast address is put in correspondence with the unicast address of the potential receiver terminal T$_y$ and with the ascending filter A$_1$ stored previously.

The steps of discrimination 105, deduction 106 of the multicast address at the level higher than the link level MUA$_{x+1}$ then the deduction of the multicast address at the link level MUA$_x$ executed by the module $1_{30}$, $1_{31}$ respectively are then followed by the succession of steps referenced G in FIG. 4a, which are explained with reference to FIG. 4b.

With reference to the figure mentioned previously, the reliability module 1 for the transmission of a multicast stream, in accordance with the subject of the invention, makes it possible to carry out a step 107 consisting of calculating a descending filter denoted as B$_1$. This step is executed by module $1_{10}$ for the calculation of the filters at the link level, which retrieves the multicast address at the link level stored previously, in order to form a filter based on the multicast address at the link level mentioned previously. The descending filter then has the form:

filter B=(level_2_destination_address=multicast_address_deduced_from_106)

the descending filter can for example correspond to:

filter B$_1$=(MAC address destination=01:00:5E:01:02:0B).

The descending filter B$_1$ is then stored in the database DB using the module $1_0$ and put in correspondence in the latter with the unicast address of the potential multicast receiver terminal T$_y$ with the ascending filter A$_1$ described previously and the multicast address at the link level stored previously.

A step 108 for placement of the descending filter B$_1$ on the port P$_1$ to which the multicast server MS is connected is then executed by the module for placement of the filters at the link level referenced $1_{11}$.

The step 108 mentioned previously is then followed by a step 109 consisting of calculating the substitution rule denoted C1 in FIG. 4b. This step is executed by the module I40 which retrieves from the database DB, the multicast address at the link level, the unicast address of the potential multicast receiver terminal T$_y$ and an identifier corresponding to the descending filter B$_1$, in order to form the substitution rule denoted type C rule, designated SR(MUA$_x$, UNA$_y$) previously in the description.

The rule mentioned previously allows the multicast address at the link level of the destination to be replaced by the unicast address at the link level of the potential multicast receiver terminal T$_y$ stored previously in the database DB, during the launch of the procedure represented in FIG. 4a for the filtered frame intercepted by the descending filter B$_1$.

An example of the substitution rule is the following:

rule C$_1$: (destination_link_level_address_"01:00:5E:01:02:0B") substituted by destination_link_level_address_"09:88:5E:01:99:99" for the frames filtered by the descending filter B$_1$.

In any case; following step 109, a return to step 102 for verification of the presence of the ascending filter is provided, in order to allow interception of any ascending multicast frame to take place.

Each multicast frame filtered by the descending filter $B_1$ is intercepted by the retrieval module for filtered frames $1_{12}$, transmitted to the module for the analysis of filtered frames $1_6$ then redirected, accompanied by the identifier of the descending filter $B_1$, to the module $1_{41}$ for application of the substitution rules. The latter then executes the application of the corresponding substitution rule, i.e. the rule corresponding to a frame intercepted by the descending filter $B_1$ having as a destination address at the link level the multicast address deduced at step 106 of FIG. 4a.

After the application of the rule mentioned previously, the module $1_{41}$ relays the intercepted frame to the module $1_5$ for sending the frames for switching to the port so that the frame mentioned previously can be switched to its new destination, i.e. the unicast address at the link level of the potential multicast receiver terminal $T_y$.

In a non-limitative embodiment of the system and the reliability module for the transmission of a multicast stream which are subjects of the invention, the ascending filter $A_1$ can be maintained throughout the multicast session, in order to intercept the multicast signalling messages originating from the potential multicast receiver terminal $T_y$. This advantageous embodiment variant is represented by the return loop relating to test 104, for a negative response to the type of message, to the test 102 in FIG. 4a. The signalling messages mentioned previously allow the module and the reliability system for the transmission of a multicast stream over a shared network which is the subject of the invention, to maintain and, if need be, to adapt each descending filter B1 as well as the corresponding substitution rules $C_1$.

Finally, it is shown that, in FIG. 4b, the operations of retrieval and analysis of frames at step 111 and application of the substitution rule $C_1$ at step 112 then forwarding the frame to the ports for switching at step 113 executed respectively by modules $1_{12}$, $1_{16}$, $1_{41}$ and $1_5$, are of course executed for each substituted multicast frame, this successive operation being represented by the return loop between step 113 of FIG. 4b and the test 110 for the presence of the descending filter $B_1$ on the port $P_1$ to which the multicast server MS is connected.

Various directions will now given with respect to the adaptation procedures followed by the reliability module 1 for the transmission of a multicast stream over a shared network, which is a subject of the invention, to take into account the changes in the transmission of a multicast stream or streams to a specific multicast receiver terminal $T_y$.

When a potential multicast receiver terminal $T_y$ already belongs to a multicast group, i.e. when it receives a multicast broadcast which is broadcast under an address of a given multicast but this broadcast is carried out using substituted multicast frames, when the terminal mentioned previously wishes to subscribe to a new multicast group or to leave a multicast group, for example, the reliability module 1 which is the subject of the invention allows adaptation to these changes of situation and, in particular, to adapt the descending filters of type B already implemented or the addition of new filters.

These adaptations are of course made possible by the fact that the ascending filter $A_1$ for interception of the multicast signalling messages, remains and is maintained in place throughout a multicast session or finally a plurality of multicast sessions. The ascending filter mentioned previously thus makes it possible throughout a multicast transmission, to filter and intercept messages relating to:

registration of the potential multicast receiver terminal $T_y$ to a new multicast group;

cancellation of registration of the potential multicast receiver terminal $T_y$ to one of the multicast groups with which it is registered.

Generally, it is shown that during the interception of a multicast message indicating an accession request, an "Access" type multicast message as described previously, by the potential multicast receiver terminal $T_y$ relating to a request to join a new multicast group identified by another multicast address at the level higher than the link level, the procedure can be summarized as:

interception of the frame of this message by the ascending filter $A_1$ maintained on the port $P_i$ to which the terminal $T_y$ is connected, and execution of discrimination steps 105 and 106, then deduction of the multicast address at the link level $MUA_x$ in FIG. 4a.

Following the operations of steps 105 and 106 of FIG. 4a mentioned previously, for the new group that terminal $T_y$ wishes to join, the new address is stored in the database DB using the storage/extraction module $1_0$ shown in FIG. 3b as described previously. In the database DB, this new multicast address is put in correspondence with the ascending filter $A_1$ as well as with the unicast address of the potential multicast receiver terminal $T_y$ already stored.

The procedure of steps G of FIG. 4a as a whole is executed according to FIG. 4b and continued as described previously in the description by calling step 107 for calculation of a filter $B_2$, a descending filter separate from the filter $B_1$, then placing the descending filter $B_2$ at step 108 on port $P_1$ or a separate port to which the multicast server MS or another server is logically connected. Step 108 is followed by a step 109 for the calculation of another substitution rule $C_2$ at step 110 for the test for the presence of the descending filter $B_2$ on the appropriate input/output port, then by the execution of steps 111, 112 and 113 to each filtered frame by the descending filter $B_2$, application of the substitution rule $C_2$ and corresponding forwarding of the frame to the ports for switching at step 113 for transmission of each substituted multicast frame in accordance with the substitution rule $C_2$ established at step 109.

Thus, registration of the potential multicast receiver terminal $T_y$ to a new multicast group with a different group address from the previous one is reflected by implementation of a new substitution rule $C_2$ and implementation of a new filter of type $B_2$.

A more detailed description of a particular procedure of cancelling a registration or joining by a potential multicast receiver terminal $T_y$ to a open multicast session for the latter will now be given with reference to FIG. 4c.

During the interception of a multicast message indicating a request from the potential multicast receiver terminal $T_y$ to leave its multicast group, i.e. during the recognition of a multicast message of the "Withdrawal" type identified of course by a multicast address at the level higher than the link level, i.e. a multicast group address, the procedure is then as follows:

the frame containing the end-of-session message is intercepted by the ascending filter $A_1$. The filtered frames analysis module $1_6$ analyses the frame mentioned previously and detects the signalling message of the "Withdrawal" type. The intercepted frame mentioned previously is copied by the frames analysis module $1_6$ and the original frame is sent to module $1_5$ for sending frames for switching to the port, which then proceeds to step 114 to the transmission of the frame to software infrastructure for managing the ports SPIM;

the copied frame is sent to module $1_{30}$ for retrieval of the multicast address at the level higher than the link level, the module $1_{30}$ mentioned previously then proceeding at step 114 to the extraction of the multicast address at the level higher than the link level, the address of the multicast group that the potential multicast receiver terminal wishes to leave.

By way of a non-limitative example, the multicast address at the level higher than the link level can be a multicast IP address=239.1.2.11.

The module $1_{31}$ for deducing the multicast address at the link level proceeds to deduce the multicast address at the link level from the multicast address of the level higher than the link level mentioned previously according to a rule already known as such. This operation is carried out at step 115 in FIG. 4*c*.

By way of example, the multicast address at the link level can correspond to a multicast MAC address=01:00:5E:01:02:0B deduced from the IP address 239.1.2.11 mentioned previously.

Following step 115, and starting from the multicast address at the link level, and the identifier of the ascending filter $A_1$, the reliability module 1 for the transmission of a multicast stream over a shared network, which is a subject of the invention, deduced from the multicast address at the link level mentioned previously and the identifier of the filter $B_1$, descending filter, the substitution rule $C_1$ to be deleted at step 116. Step 116 is then followed by a step 117 consisting of determining, from the multicast address at the link level and the identifier of the filter $A_1$ contained in the database DB, the descending filter $B_1$ to be removed on the port $P_1$, to which the multicast server MS is connected. The descending filter B1 is removed by deactivation by the module $1_{11}$ for placing the filters at the link level.

Step 117 can be followed by a test step 118 making it possible to verify whether there is another substitution rule, such as rule $C_2$ mentioned previously, relating to the unicast address of the potential multicast receiver terminal $T_y$. This operation is symbolized by the symbolic relationship:

∃$C_2$,UNA$_y$?

the existence of another substitution rule $C_2$ being associated with the unicast address terminal UNA$_y$.

If there is a positive response to the test 118 mentioned previously, the procedure for rejection of a registration to the multicast stream corresponding to the descending filter $B_1$ and the substitution rule $C_1$ is terminated. Otherwise, if there is a negative response to the test 118 mentioned previously, there is no other substitution rule existing for the terminal $T_y$ of unicast address UNA$_y$, then a step 119 for the removal of the filter $A_1$, ascending filter relating to the terminal mentioned previously on the port $P_j$, is executed by the module for placing the filters at the link level $1_{11}$. Since the potential receiver terminal $T_y$ has left all the multicast groups to which it was registered, this terminal can be managed as any terminal and subject to monitoring for any new launch of the multicast/unicast procedure, as represented in FIG. 4*a* by module 1 and the reliability system for the transmission a multicast stream over a shared network, in accordance with the subject of the present invention.

Figure 5:
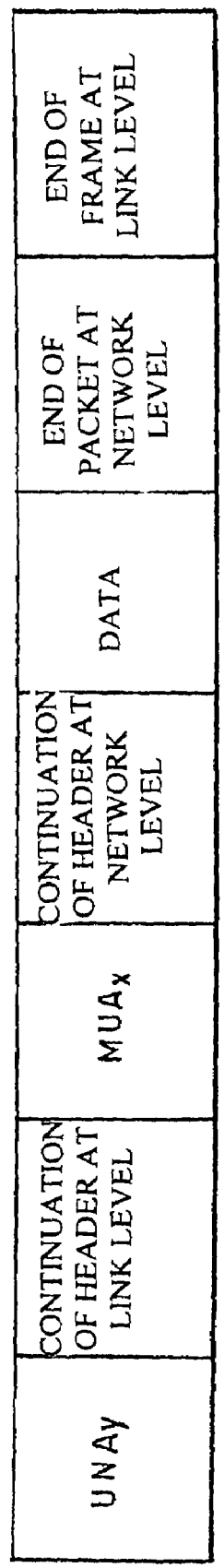
FIG. 5 represents a illustrative diagram of a substituted multicast frame, in accordance which the subject of the present invention.

Finally, FIG. 5 represents a transmission frame of a multicast stream obtained thanks to the implementation of the method which is the subject of the invention. This frame constitutes a substituted multicast frame comprising a unicast address at the link level, the address UNA$_y$, a continuation of the header at link level, the multicast destination address at network level, the group address MUA$_x$, a continuation of the header at the network level, a data field, multicast data, an end-of-packet field at the network level and an end-of-frame field at the link level.

The invention claimed is:

1. A method for transmitting a multicast stream over a digital data exchange network, wherein said method is performed in an access point, the method comprising:
   analyzing a plurality of multicast frames of said multicast stream, in order to detect a multicast address at a link level of said multicast stream, wherein the analyzing includes:
      detecting a unicast address at the link level of a terminal;
      determining, from the detected unicast address at the link level, an ascending filter for intercepting multicast data frames transmitted by said terminal;
      analyzing at least one multicast data frame intercepted by said ascending filter, in order to determine a type of multicast session message transmitted; and
      if a multicast session message of accession type to the multicast stream requested by said terminal is detected during said analysis:
         retrieving, from said multicast session message of accession type, the multicast address at a level higher than the link level of said requested multicast stream;
         deducing, from the retrieved multicast address at the level higher than the link level, the multicast address at the link level;
   substituting, in each multicast data frame designated by said multicast address at the link level, said multicast address at the link level with said unicast address at the link level, in order to generate a substituted multicast frame; and
   transmitting, in place of said multicast stream, at least one unicast stream comprising a succession of substituted multicast frames, to said unicast address at the link level.

2. The method according to claim 1, wherein the link level comprises a level 2 of the layers of the OSI model, for the definition of multicast and unicast streams.

3. The method according to claim 1 or 2, wherein substituting the multicast address at the link level with the unicast address at the link level is carried out by filtering and redirection of the address of the data frames received having the multicast address at the link level to said unicast address at the link level.

4. The method according to claim 1, wherein the step of substituting the multicast address at the link level with the unicast address at the link level comprises:
   determining a descending filter for intercepting data frames transmitted by said multicast stream, from said multicast address at the link level;
   defining a substitution rule for the unicast address at the link level to said multicast address at the link level;
   analyzing at least one data frame of the multicast stream intercepted by said descending filter;
   applying said substitution rule for the address to said intercepted data frame, in order to generate the substituted multicast data frame.

5. A system for transmitting a multicast stream over a data exchange network installed in an access point of the network, the access point having a plurality of input/output ports comprising one of the input/output ports which is logically connected to a multicast stream server and at least one other input/output ports which is connected to a terminal receiving a multicast stream, said terminal being designated in the data exchange network by a unicast address at a determined link level, and a software infrastructure module for managing said input/output ports, the system comprising:

a reliability module for transmitting, in place of any multicast stream transmitted by said multicast server, at least one unicast stream comprising a succession of substituted multicast data frames in which a multicast address at the link level is substituted by the unicast address at the determined link level of said terminal, to said terminal;

a database having at least one permanent database, containing configuration data of said reliability module and a temporary database, making it possible to maintain a state of one or a plurality of terminals receiving the multicast stream, each connected to the one of said input/output ports;

a unicast address retrieval module for detecting the unicast address of said terminal;

a filtering and intercepting unit for filtering and intercepting the multicast frames from the multicast frames transmitted by the software infrastructure module for managing the input/output ports; and a deducing unit for deducing the multicast address at the link level, contained in said multicast frame, from the multicast address at a level higher than the link level.

6. The system according to claim 5, wherein the reliability module comprises:

a storage module for the storage/extraction of data from said database, wherein the reliability module is connected to said storage/extraction module;

a substituting unit for defining and applying substitution rules for a unicast address at the link level to the multicast address at the link level;

a sending module for sending frames for switching to the input/output port to which said terminal is connected, said module for sending frames being controlled by said sequence for defining and applying the substitution rule; and an analysis module for analyzing intercepted and filtered multicast frames provided by said sequence for filtering and intercepting the filtered multicast frames, said analysis module, depending on the analysis carried out on each intercepted, filtered, multicast frame making it possible either to:

forward said frame to the module for sending frames for switching without changing to the input/output port at which said terminal receiving a multicast stream is connected; or copy said frame, the transmission of said copy to said sequence for deducing the multicast address at the link level, the transmission of said frame to said module for sending frames for switching to said input/output port; or transmit said frame to said sequence for defining and applying a substitution rule for unicast address at the link level to the multicast address of link level.

7. The system according to claim 5 or 6, wherein on connection of a terminal receiving a multicast stream at one of the input/output ports, said system performs the steps of:

determining an ascending filter for the interception of data frames transmitted by said terminal of a multicast stream from the unicast address at the link level of this latter;

placing said ascending filter on the input/output port to which said terminal is connected and verifying the presence of said ascending filter on said input/output port;

intercepting at least one data frame transmitted by said terminal with the ascending filter;

detecting the type of said intercepted data frame; and, depending on the type of said intercepted data frame and on whether the message transmitted by said terminal is a message requesting access to a multicast broadcast;

retrieving the multicast address in said frame at a level higher than the link level of the requested multicast stream; and deducing and storing, from said multicast address at the level higher than the link level, the address at the link level of the requested multicast stream.

8. The system according to claim 5, wherein, for any retrieved multicast address at the link level of a multicast stream requested by a terminal, said system performs the steps of:

determining a descending filter for inspecting data frames transmitted by said multicast stream, from the retrieved multicast address at the link level;

defining a substitution rule for an address between the multicast address at the link level and the unicast address at the link level and verifying the presence of said descending filter on the input/output port to which said multicast server is connected;

intercepting and analyzing the destination of each data frame transmitted by the multicast stream filtered by said descending filter;

applying substitution rule to the multicast address at the link level of each multicast data frame being substituted by the unicast address at the link level of said terminal receiving the multicast stream, in order to generate a substituted multicast data frame;

forwarding each substituted multicast data frame to the switching port to which said terminal is connected; which makes it possible to transmit each substituted multicast data frame under the unicast address at the link level of said terminal and to benefit from the security and the reliability of transmission of the unicast protocol.

9. The system according to claim 7 wherein depending on the analysis of the type of at least one data frame transmitted by said terminal receiving a multicast stream, whether said message is a message ending access to said multicast stream, said system executes at least, successively:

retrieving the multicast address in the frame at a level higher than the link level of the requested multicast stream;

deducing from said multicast address at a level higher than the link level, of the address at the link level of the requested multicast stream;

deleting the corresponding substitution rule;

suppressing the descending filter on the input/output port to which said multicast server is connected and verifying the non-existence of another specific rule relative to the unicast address at the link level of said terminal; and suppressing the ascending filter on the input/output port to which said terminal is connected.

10. A non-transitory computer readable medium encoded with a program to, upon connection of a terminal receiving a multicast stream to one of a plurality of input/output ports of an access point, perform the steps of:

determining an ascending filter for the interception of data frames transmitted by said terminal;

placing said ascending filter on the input/output port to which said terminal is connected;

verifying the presence of said ascending filter on said input/output port;

intercepting at least one data frame transmitted by said terminal with the ascending filter;

detecting the type of said intercepted data frame, and, depending on the type of said data frame and on whether the message transmitted by said terminal is a message requesting access to a multicast broadcast:
- retrieving, in said frame, a multicast address at a level higher than the link level of the requested multicast stream; and
- deducing and storing, from said retrieved multicast address at the level higher than the link level, the multicast address at the link level of the requested multicast stream; and
- substituting, in each multicast data frame designated by said multicast address at the link level, said multicast address at the link level with said unicast address at the link level, in order to generate a substituted multicast frame.

11. A non-transitory computer readable medium encoded with a program to, depending on the type of at least one multicast data frame transmitted by a terminal having a multicast address of a multicast stream, and whether a message conveyed by said multicast data frame is a message ending access to said multicast stream, perform the steps of:
- retrieving, in said multicast data frame, the multicast address at a level higher than the link level of the requested multicast stream;
- deducing, from said multicast address at a level higher than the link level, a multicast address at the link level of the requested multicast stream;
- deleting a corresponding substitution rule;
- wherein the corresponding substitution rule is defined as substituting, in each multicast data frame designated by said multicast address at the link level, said multicast address at the link level with said unicast address at the link level, in order to generate a substituted multicast frame,
- suppressing a descending filter on the input/output port of an access point to which a multicast server is connected; and
- following the verification of the non-existence of a specific rule relative to the unicast address at the link level of said terminal, suppressing an ascending filter on an input/output port of the access point to which said terminal is connected 12. The non-transitory computer readable medium of claim 11, wherein the program further comprises the step of transmitting the frame of a multicast stream, wherein said frame is a substituted multicast frame comprising a unicast address at the link level for transmission over a data exchange network.

13. An access point in a data exchange network comprising:
- a plurality of input/output ports managed by a software infrastructure module comprising one input/output port which is logically connected to a multicast stream server by an extended network, and at least one other input/output port which is intended to be connected to a terminal receiving a multicast stream, designated in the shared network by its unicast address at the link level;
- a module for the reliability of the multicast transmission able to transmit, instead and in place of any multicast stream, at least one unicast stream to said terminal making a request, said unicast stream having a succession of substituted multicast data frames in which a multicast address at the link level is substituted by the unicast address at the link level of said terminal making a request;
- an intercepting module for detecting the unicast address of said terminal;
- a filtering and intercepting unit for filtering and intercepting the multicast frames from the multicast frames transmitted by the software infrastructure module which manages the input/output ports;
- a deducing unit for deducing the multicast address at the link level, contained in said multicast frame, from the multicast address at a level higher than the link level.

* * * * *